United States Patent [19]

Carter

[11] Patent Number: 5,119,740
[45] Date of Patent: Jun. 9, 1992

[54] PAPERBOARD STORAGE BIN

[75] Inventor: Leewood C. Carter, Riceville, Tenn.

[73] Assignee: Reusable Rolls, Inc., Riceville, Tenn.

[21] Appl. No.: 791,007

[22] Filed: Nov. 12, 1991

Related U.S. Application Data

[63] Continuation-in-part of Ser. No. 557,184, Jul. 24, 1990, Pat. No. 5,067,418.

[51] Int. Cl.⁵ .............................................. B65D 19/12
[52] U.S. Cl. .................................................. 108/56.3
[58] Field of Search ............ 108/55.1, 56.1, 51.1, 108/56.3, 51.3; 206/598, 599, 600, 386

[56] References Cited

U.S. PATENT DOCUMENTS

| | | | |
|---|---|---|---|
| 3,256,839 | 6/1966 | Peterson et al. | 108/56.1 |
| 3,683,822 | 8/1972 | Roberts et al. | 108/56.3 X |
| 4,295,431 | 10/1981 | Stavlo | 108/55.1 |
| 4,453,471 | 6/1984 | Harrington et al. | 108/55.1 |
| 4,635,562 | 1/1987 | Kreeger | 108/55.1 |
| 4,765,252 | 8/1988 | Shuert | 108/56.1 X |
| 4,901,650 | 2/1990 | Armstead | 108/55.1 |
| 4,915,033 | 4/1990 | Bond | 108/55.1 |
| 4,936,451 | 6/1990 | Shuert | 108/55.1 X |
| 5,067,418 | 11/1991 | Carter | 108/56.3 |

Primary Examiner—Peter A. Aschenbrenner
Attorney, Agent, or Firm—Alan Ruderman

[57] ABSTRACT

A storage bin constructed entirely from hollow thick walled cylindrical paperboard cores has upright cylindrical corner posts connected to a floor and to side walls in the form of a series of slats. The floor includes runners which are hollow cylindrical cores having notches extending transversely through the periphery and has deck members in the form of elongated segments cut from other cylindrical cores, the deck members being positioned within aligned notches in the runners. The side wall slats also are elongated segments cut from cylindrical cores and are positioned within slots cut in the posts, the slats extending between adjacent posts. The floor runners and the posts are connected together by bifurcating the ends of each runner into a pair of legs which are slidably inserted into notches cut in the post, a locking tab being positioned through both the bifurcated legs and the center of the post. A vertically extending elongated locking strip is positioned within the hollow of one of the posts to preclude inadvertent removal of the side slats after they have been positioned through the slots in the posts.

25 Claims, 2 Drawing Sheets

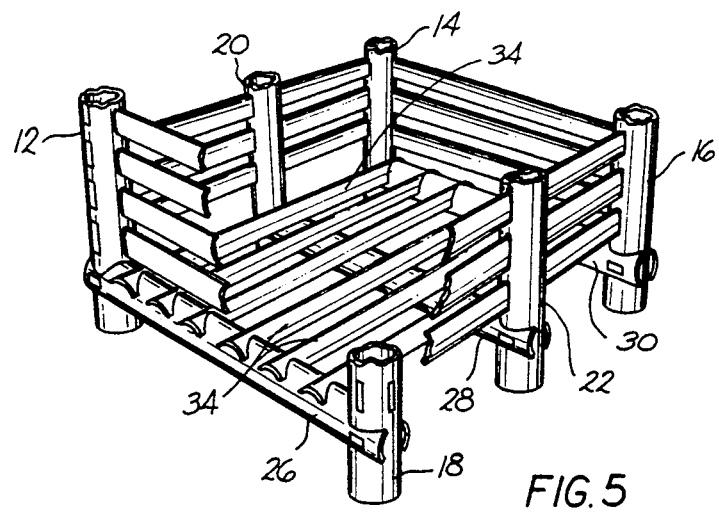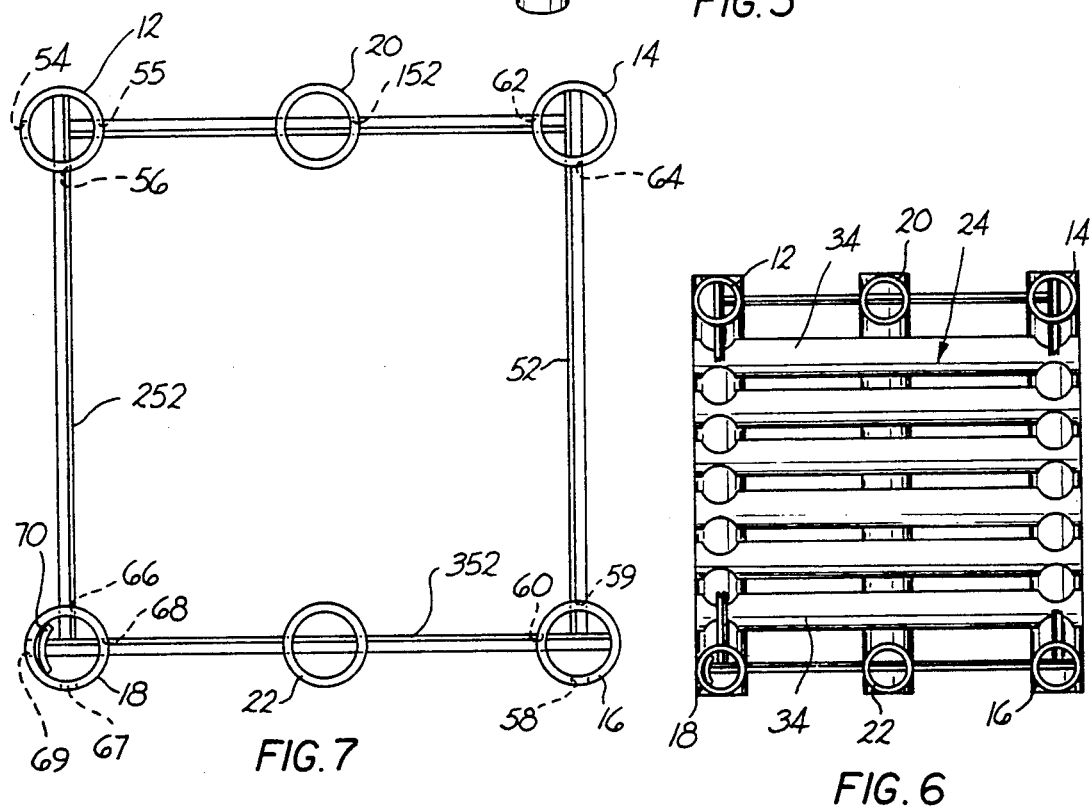

PAPERBOARD STORAGE BIN

REFERENCE TO RELATED APPLICATIONS

This application is a continuation-in-part of copending U.S. patent application Ser. No. 07/557,184 filed Jul. 24, 1990, now U.S. Pat. No. 5,067,418.

BACKGROUND OF THE INVENTION

This invention relates to storage bins constructed from paperboard, and more particularly to storage bins constructed from hollow paperboard cores or tubes which heretofore generally have been considered as waste material.

Large amounts of thick walled paperboard or fiber cores or tubes are used by various industries which thereafter must be disposed of. For example, paper, carpet, cloth and plastics are wound about such cores by paper, carpet, clothing and plastic manufacturers respectively, and after removal of these products from the cores, the cores generally are disposed of. The results of a survey reported upon in the October 1989, issue of "American Paper Maker" indicates that of some 61 printers surveyed in the United States the usage of fiber core per year ranged from 20 to 1,250 tons, and that of these printers some 44 percent disposed of the cores by landfill while 25 percent sell the cores with scrap paper and 25 percent use a waste disposal service. Most (61 percent) of the printers surveyed experienced disposal problems not the least of which is the cost involved in disposing of the fiber cores. The conclusion of the survey was that fiber core disposal is a growing and costly problem among printers. The same can be said of the cores about which carpet is wound.

One of the problems in disposing of heavywall cores or tubes, i.e., those cores having between 0.30 and 0.75 inch or approximately one-half inch wall thickness, is that generally they are not desirable for recycling into new paperboard because they do not breakdown readily in the pulper due to the size and mass of the cores, e.g., paper cores are typically five feet to eight feet in length, have various outside diameters, four inch, five inch and six inch being very common, and three-eights to three-quarter inch wall thickness. Carpet cores may range in length from eight feet to fifteen feet. With landfills rapidly reaching saturation levels, governmental authorities are mandating the recycling of packaging material. Accordingly, it is imperative that efficient recycling use of these cores or tubes be found.

Although the need for recycling of paperboard materials has been recognized, the known prior art did not propose the recycling of cores or tubes of the aforesaid type in a useful manner until the pallets disclosed in the aforesaid patent application were proposed. The success of these pallets has instigated research for products which have the potential for construction from such cores or tubes. One such product is a storage bin which heretofore has been constructed from wire or rods, e.g. see U.S. Pat. Nos. 3,478,914 and 4,795,057. Such bins may have the capability of disassembly for transportation and rapid assembly when necessary, such as a metal and plastic collapsible container disclosed in U.S. Pat. No. 3,265,240. Such bins are useful in manufacturing facilities for storage of various parts which are subsequently used or for items which are subsequently discarded.

SUMMARY OF THE INVENTION

Consequently, it is a primary object of the present invention to provide a storage bin or container constructed substantially entirely from spent paperboard cores or tubes which may have been used previously for other purposes.

It is another object of the present invention to provide a rigid load supporting storage bin constructed and assembled entirely from used paperboard or fiber cores or tubes which storage bin may be utilized in the same manner as conventional storage bins.

It is a further object of the present invention to provide a rigid load supporting storage bin constructed entirely from used paperboard or fiber cores or tubes which may be readily assembled and disassembled, and wherein spent elements of the storage bin may be more readily broken down in a paper mill pulper than the starting material.

It is a still further object of the present invention to provide a storage bin constructed from paperboard or fiber cores or tubes interconnected together and locked securely by segments of paperboard or fiber cores or tubes to provide a rigid load bearing structure including a floor and sides, the bin being utilized in the same manner as conventional storage bins and being readily assembled and disassembled.

Accordingly, the present invention provides a storage bin constructed from paperboard, the bin having upright posts securely connected with elongated side members formed from segments of paperboard cores or tubes and having a floor constructed from paperboard cores or tubes in the form of runners connected to deck or platform members in a manner similar to the pallet disclosed in the aforesaid patent application. The terminology fiber cores and paperboard cores or tubes used herein appear to be distinguishing terms in the various arts. For example, the paper manufacturing industry apparently uses the terminology paperboard or fiber cores, while the carpet industry merely appears to designate these as paperboard tubes. In either case, for consistency, the terminology paperboard cores or tubes will be utilized hereinafter, it being understood that although other materials may be included, the cores are substantially paperboard.

In the preferred form of the invention, the storage bins are constructed entirely from paperboard cores which preferably have been previously used and would therefore otherwise be waste material eventually typically disposed of in a landfill. The cores in the preferred embodiment are hollow tubular cylindrical members having a circular cross sectional configuration since cores of other configurations comprise only a minimal amount of the cores initially used by industry. Thus, the upright posts and the floor runners in the preferred embodiment ar formed from such cores by cutting slots and notches for receiving segments of other cores which form the sides of the bin and the deck members defining the floor of the bin and cutting out other slots for receiving locking tabs and a strip formed from segments of cores for securely locking the elements together into a rigid structure. With this construction the various members of the bin may be assembled and tightly secured together by friction without the need for adhesives, and thus may be transported in unassembled form and assembled when needed. This additionally provides the advantage of rapid disassembly for storage in a small space when the bins are not needed, and permits replacement of spent members of a bin when the remaining members are still usable.

In the preferred embodiment of the invention, the cores forming the posts and the runners may be constructed merely by cutting the cores to the desired lengths and cutting notches therein while the side members and the deck or platform members may be longitudinally sliced or cut into segments of the proper size from similar tubular cores. Additionally the locking tabs and a locking strip are longitudinal segments of such tubular cores which are cut to the required lengths, such tabs being utilized for securing the runners and posts together and the strip being utilized for securely locking the side members and the posts together.

BRIEF DESCRIPTION OF THE DRAWINGS

The particular features and advantages of the invention as well as other objects will become apparent from the following description taken in connection with the accompanying drawings in which:

FIG. 4 is a fragmentary perspective view of an end of a floor runner;

FIG. 5 is a view similar to FIG. 1 but with portions thereof fragmented to illustrate the floor of the bin;

FIG. 6 is a top plan view of the bin illustrated in FIG. 1 with side portions broken away; and FIG. 7 is a top plan view of the bin illustrated in FIG. 1 with the floor runners and deck members omitted.

DESCRIPTION OF THE PREFERRED EMBODIMENT

Figure 1:
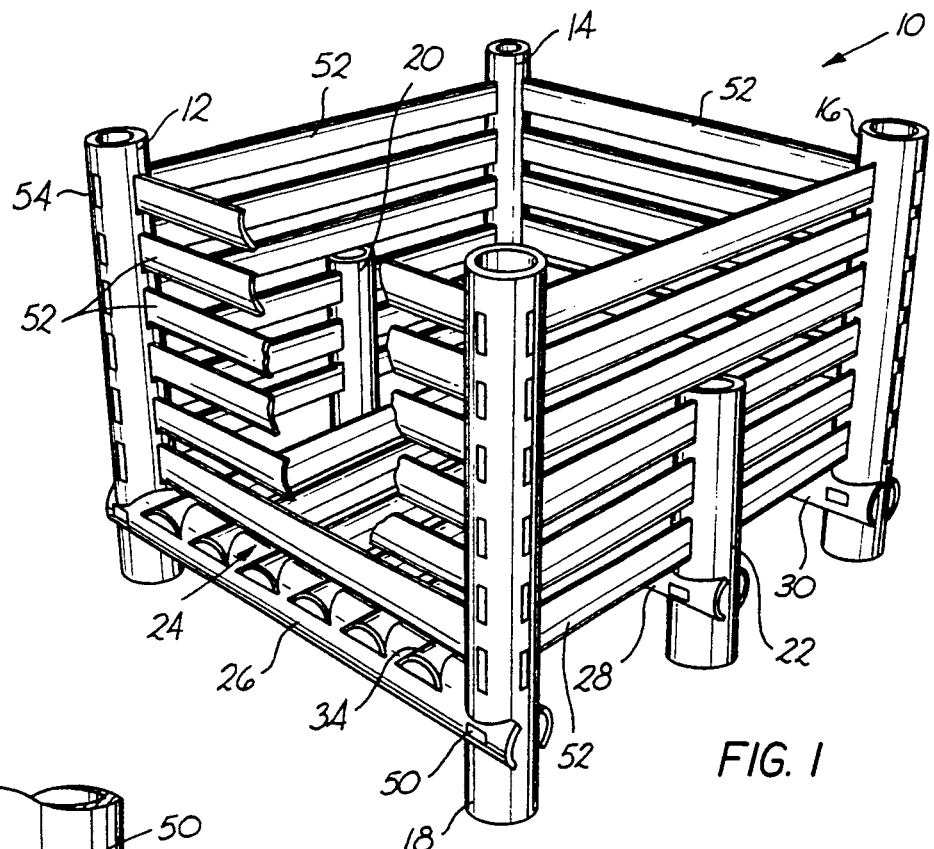
FIG. 1 is a perspective view of the preferred form of a storage bin constructed in accordance with the principles of the present invention with portions of the bin being broken away.

Referring now to the drawings, a storage bin generally designated at 10 constructed in accordance with the preferred form of the present invention comprises a plurality of vertical posts, the bin preferably being rectangular in plan and having four corner posts 12, 14, 16, 18. Furthermore, there may be additional smaller posts intermediate the corner posts such as 20, 22 for providing increased rigidity where the distance between any of the posts is such as to make this desirable. Each of the posts 12, 14, 16, 18 is constructed from paperboard cores, preferably previously used cores which generally would be waste material headed to a landfill, but may alternatively be new cores wound by conventional equipment. These cores are readily available as hollow cylindrical members in varying lengths; generally five feet, eight feet and twelve feet lengths are the most available, and generally have a four inch, five inch or six inch outside diameter. Other sizes are available and all such cores may be utilized in the present invention. Cores of this type are typically used as a disposable mandrel about which paper, linerboard, carpet or the like are wound in a roll and remain with the primary product until the roll is exhausted. They are most often not desirable for recycling at paperboard mills since in their original form they do not readily break down in a pulper. They are known as thick walled cores and have approximately one-half inch wall thickness, the wall thickness generally varying from about 0.3 to 0.75 inch. Other hollow core cross sectional configurations, e.g., square, rectangular and other configurations are also available but in substantially smaller quantities, and they too may be utilized in accordance with the present invention, so that the designation core includes all such configurations. The most readily available cores are the four inch diameter size, and it is expected that most of the tubular members of the bins will utilize cores of this size.

Figure 2:
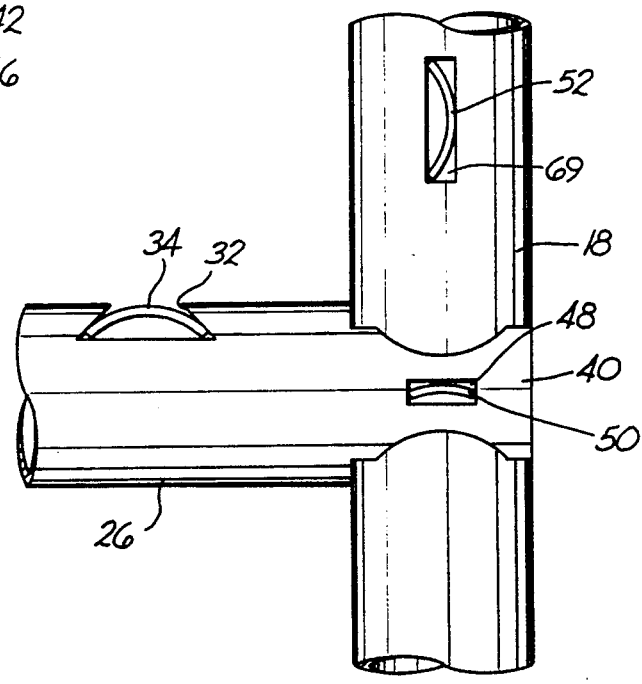
FIG. 2 is a fragmentary elevational view of the junction of a post and a floor runner of the bin illustrated in FIG. 1.

The floor 24 of the storage bin is similar to the pallet described in the aforesaid patent application and comprises a plurality of longitudinally elongated runners 26, 28, 30 also constructed from paperboard cores of the aforesaid type. The runners include a plurality of notches 32, as best illustrated in FIG. 2, at longitudinally spaced locations extending transversely relative to the axis of elongation of the runners. Although the notches may be open ended or enclosed, it is preferred that the notches be open ended on the periphery of the runners for ease and economy of manufacture. Disposed within each notch 32 is a deck member 34 preferably formed from longitudinal segments of cores, as hereinafter described, the members 34 forming the deck of the floor 24 and being designated as deck members. The size, shape and depth of the notches 32, as hereinafter described, permit the upper surface of the deck members to be substantially flush with the upper surface of the runners to provide a flat deck. The notches 32 of the various runners 26, 28, 30 are disposed at substantially the same transverse location so that the notches 32 of the respective runners may be aligned to receive the deck members 34 as illustrated. Although any number of runners and deck members may be utilized, three such runners may typically be utilized with a sufficient number of deck members to support the varying loads to be received in the bin.

The notches 32 may be of any convenient configuration permitting a tight and secure fit with the deck members 34 and, in the preferred embodiment, the notches 32 have a dovetail configuration, the wider portion of the notches be radially further into the body of the runner and narrowing toward the periphery as illustrated in FIG. 2. This arrangement permits the deck members to be fitted and slidably positioned within the respective notches during assembly and held therein by friction without being released in the radial direction. Thus, adhesives, mechanical fasteners or the like are not required and a user of the bin may readily adjust its size in at least on direction to smaller sizes merely by adjusting the runners closer together and trimming the deck members. Of course, the runner lengths may also be shortened by trimming and re-cutting one end for connecting to the respective post as hereinafter described. Larger bins may be created by using longer length deck members with the runner spaced further apart or with the use of one or more additional runners.

Figure 3:
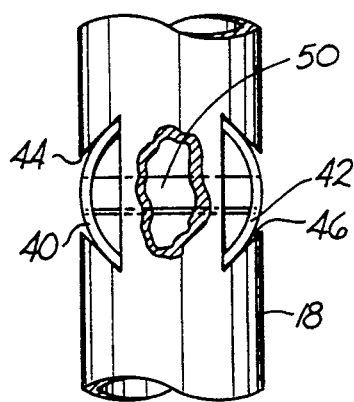
FIG. 3 is a fragmentary elevational view of the post and floor runner illustrated in FIG. 2 turned 90° therefrom.

The means for connecting the floor 24 to the corner posts 12, 14, 16, 18 is illustrated in FIGS. 2-4 in conjunction with the corner post 18 and the runner 26, it being understood that the connection between the other runners and posts are substantially identical. At each end of the runner 26 and each of the other runners 28, 30 there is a longitudinally extending slit 36 along the periphery, best illustrated in FIG. 4, the slit extending lengthwise a distance substantially equal to the diameter of the post 18 and of a width somewhat narrower than the diameter of the post as understood from FIG. 3. A similar slit 38 is formed on the peripheral surface of the runner 26 180° from the slit 36, the slit 38 being substantially identical to the slit 36. Thus, each end of the runner 26 as a result of the slits 36 and 38 is bifurcated into a pair of connecting legs 40, 42.

Furthermore, the post 18, and of course each of the other posts has a pair of notches 44, 46, each notch being similar to the notches 32. The notches of each pair are radially spaced apart on the post, i.e., 180° apart, at a vertical location desired for the disposition of the floor of the bin. The size of each notch 44, 46 in the longitudinal direction of the post is such as to slidably receive and frictionally hold the respective legs 40, 42 at the end of the runner, and the depth of the notches in the radial direction of the post 18 is such that the central portion of the convex exterior surfaces of the legs 40, 42 are substantially coplanar or flush with the peripheral surface of the post as illustrated in FIG. 3, i.e., the legs 40 and 42 are within the respective notch 44, 46 and provide a continuation of the peripheral surface of the post at the central portion of the respective leg 40, 42.

Thus, each end of a runner may be connected to a respective post, and may be securely locked in this position. In order to securely lock a runner and post together, a slot 48 is formed through each pair of legs 40, 42 for receiving a locking tab 50 which bridges the legs 40 and 42 and prevents them and thus the runner from being pulled out of the notches 44, 46. This same construction may be utilized for securely connecting and locking the remaining runners to the respective other posts. The locking tab 50 may merely be a longitudinally extending small segment of a paperboard core.

Each of the sides of the bin comprises a plurality of slats 52, 152, 252, 352, the slats being longitudinal segments of cores similar to or identical to the deck members 34. As will be understood, the slats 52 and 252 are substantially the same length while the slats 152 are shorter and the slats 352 are longer relative to the slats 52. The slats 52, 152, 252, 352 may be connected to the respective upstanding posts in the same manner in which the deck members are connected to the runners, i.e., being positioned at their ends within notches and this construction is considered to be included within the scope of the present invention as claimed herein. However, it has been found that a stronger more rigid storage bin, and one wherein the slats are positively locked in place, may be constructed by inserting the ends of the slats into slots formed in the posts and locking the slats in a positive manner.

Accordingly, for each tier of slats the post 12 has a slot 54 which extends radially entirely through the post and opens at a slot 55 which is 180° from the slot 54 as illustrated in FIG. 7. The post 12 also has a slot 56 which is 90° from the slots 54, 55 and opens into the interior of the post but does not extend through it so that the post 12 has three slots for each tier of slats. Similarly, the post 16 has a slot 58 extending radially therethrough and opens 180° therefrom in a slot 59, while a third slot 60 is formed 90° from these slots. The post 14, on the other hand, has only two slots 62, 64 space d90° apart, the slot 62 facing and being aligned with the slot 55 in the post 12 while the slot 64 faces and is aligned with the slot 59 in the post 16. The post 18 has first and second pairs of slots that extend radially therethrough, there being a slot 66 facing and aligned with the slot 56 of the post 12 and extending radially through the post 18 to open at a slot 67 spaced 180° therefrom, and a slot 68 facing and aligned with the slot 60 in the post 16, the slot 68 extending radially through the post 18 and opening in a slot 69 spaced 180° therefrom. Obviously, each slot is of a size for receiving a respective slat.

To assemble the side slats 52, 152, 252, 352, to the posts 12, 14, 16, 18 and in the case of the lowest tiers also to the small central support posts 20, 22 which have radial slots extending 180° therethrough and aligned with the respective slots 55, 62 and 60, 68, a first slat 52 is positioned through both of the slots 58 and 59 in the post 16 and through the slot 64 and the posts 14 until it abuts the interior surface of the post 14 opposite to the slot 64. In this position the trailing end of the slat 52 is spaced radially from the slot 58. Another slat 152 is then inserted through both of the slots 54 and 55 of the post 12 and through the slots in the support post 20, and then pushed through the slot 62 in the post 14 until it abuts the slat 52 previously inserted between the posts 14 and 16. The trailing end of the slat 152 is then spaced radially from the slot 54. Thereafter another slat 252 is inserted through the slots 67 and 66 in the post 18 and pushed through the slot 56 in the post 12 until it abuts the interior surface of the post 12 opposite to the slot 56 and also abuts the trailing end of the slat 152. The trailing end of the slat 252 is then spaced from the slot 67. A fourth slat 352 is then inserted through the slots 69 and 68 of the post 18 through the slots in the support post 22 and into the slot 60 in the post 16 until it abuts the interior surface of the post opposite to the slot 60. The slat 352 in this position also abuts the ends of the slats 52 and 252 within the respective post 16, 18 and the trailing end of the slat 352 is then spaced slightly from the slot 69. This procedure is continued until all the slats are assembled in the posts. Thereafter in order to lock the slats in these assembled positions a locking strip 70 which is a longitudinal segment of a core may be inserted vertically down into the post 18 between the ends of the slats 352 and the interior surface of the post 18 adjacent to the slots 69. This precludes the slats 352 from being inadvertently pulled loose from the post 18 and, because of the abutting relationship of the slats at each tier, provides a secure and rigid bin structure.

The storage bin may be shipped and/or stored in unassembled form and assembled when necessary. This not only reduces the required space within the shipping vehicle, and thus the shipping costs relative to prior art wire and rod bins, but also reduces the space required in a storage area.

The vertical posts 12, 14, 16, 18, the support posts 20, 22, and the runners 26, 28, 30 are formed by first cutting the starting core material to the desired lengths and thereafter cutting the slat receiving slots in the vertical posts and the deck member receiving notches 32 in the runners, and also the slits 36, 38 in the ends of the runners and the notches 44, 46 in the vertical posts. The tab receiving slots 48 in the legs at the ends of the runners may be formed prior to or after the slots 36, 38. The slots and notches may be cut into the cores by a router blade, dado blades or a milling machine, or other conventional means for cutting rectangular slots and dovetail notches. The deck members 34 and the slats 52, 152, 252, 352 as aforesaid, are formed from segments of other cores. As described in the aforesaid patent application cylindrical cores may be sectioned into longitudinal segments by cutting the hollow cores by circular saw blades, one blade making a diametrical cut and other blades making cuts parallel thereto. Thereafter the segments yielded from these cuts may be shaped. For example, a six inch diameter cylindrical core may be sectioned longitudinally by cutting into six deck members or slat members by means of a triple blade saw comprising three thin kerf cutting saw blades mounted on a common arbor, the central blade cutting along a diameter and the other two cutting in planes parallel thereto. The six pieces resulting may then be shaped by cutting waste material from the edges of the resulting pieces. The narrower locking strips 50 and 70 may be formed in similar manner although the diameter of the cylindrical cores from which they are formed, as are the diameters of the cores used for the other elements, may vary one from the other and from the diameter of the cores used for the vertical posts. For example, the vertical posts may be formed from four or five inch diameter cores while the floor members and slats may be formed from the six inch diameter cores, and the locking strip 70 may be formed from cores having a larger diameter than that of the vertical posts. It should be understood that the diameters of the tubes are not critical and will be selected from that which is available in the four inch, five inch and six inch outside diameter sizes which are generally available and which have a thick wall in the order of 0.3 to 0.75 inch.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A storage bin formed from thick wall paperboard cores, comprising a polygonical shaped frame including a substantially horizontally disposed load supporting floor having a plurality of corners, a vertically extending post at each corner, and side walls spanning adjacent posts, said floor comprising a plurality of spaced longitudinally elongated runners, said runners being formed from thick wall hollow paperboard cylindrical cores having substantially identical cross sections, wall means defining a plurality of longitudinally spaced apart notches extending transversely through each runner at substantially identical locations relative to the ends thereof, said runners being disposed so that the notches of each runner are aligned with corresponding notches in the other runners, said floor further including a plurality of transversely extending spaced apart deck members, each deck member comprising a longitudinally extending arcuate segment of a thick wall hollow paperboard core receivable within respective aligned notches of said runners in tight frictional engagement with said wall means, said posts comprising thick wall hollow paperboard cylindrical cores having substantially identical cross sections, means defining a pair of radially spaced apart notches extending from opposite peripheral surfaces in each post at substantially the same vertical location from bottom ends thereof, said runners having bifurcated ends defining a pair of spaced apart legs, each leg being tightly receivable within one notch of the pair of spaced apart notches of a respective post, each post further including a plurality of vertically spaced apart slots, the slots in each post being aligned with respective slots in an adjacent post, and said side walls each comprising a plurality of vertically spaced apart slats, each slat comprising a longitudinally extending arcuate segment of a thick wall hollow paperboard core having ends positioned within respective slots in adjacent posts.

2. A storage bin as recited in claim 1, wherein each of the notches in each runner comprises a pair of longitudinally spaced apart linear side edges, each edge being inclined from the peripheral surface of the runner in diverging manner relative to the other edge of the pair.

3. A storage bin as recited in claim 1, wherein each bifurcated end of each runner is defined by a pair of spaced apart longitudinally extending slots in the peripheral surface of said runner at an end thereof.

4. A storage bin as recited in claim 1, wherein each vertically spaced apart slot in said posts comprise apertures formed in the periphery of said post and opening into the hollow interior of the post.

5. A storage bin as recited in claim 3, including a locking tab extending transversely through each pair of legs and the respective post to prevent withdrawal of the ends of the runners from the respective post.

6. A storage bin as recited in claim 4, wherein certain of said posts have radially spaced apart aligned slots permitting respective slats to be inserted therethrough an adjacent post and to be withdrawn therefrom for disassembly.

7. A storage bin as recited in claim 6, including a vertically disposed locking strip positioned within the interior of at least one post having said radially spaced apart slots, said locking strip being interposed between the slots remote from the adjacent post and the ends of the respective slats.

8. A storage bin as recited in claim 6, wherein each of the notches in each runner comprises a pair of longitudinally spaced apart linear side edges, each edge being inclined from the peripheral surface of the runner in diverging manner relative to the other edge of the pair.

9. A storage bin as recited in claim 8, wherein each bifurcated end of each runner is defined by a pair of spaced apart longitudinally extending slots in the peripheral surface of said runner at an end thereof.

10. A storage bin as recited in claim 9, including a locking tab extending transversely through each pair of legs and the respective post to prevent withdrawal of the ends of the runners from the respective post.

11. A storage bin as recited in claim 10, including a vertically disposed locking strip positioned within the interior of at least one post having said radially spaced apart slots, said locking strip being interposed between the slots remote from the adjacent post and the ends of the respective slats.

12. A storage bin as recited in claim 9, wherein each of the notches in each post comprises a pair of vertically spaced apart linear edges inclined from the peripheral surface of the post in diverging manner relative to the other edge of the pair.

13. A storage bin formed from thick wall paperboard cores, comprising a generally rectangular shaped frame including a substantially horizontally disposed load supporting floor having four corners, a vertically extending post at each corner, and side walls spanning adjacent posts, said floor comprising a plurality of spaced longitudinally elongated runners having substantially the same length, said runners being formed from thick wall hollow paperboard cylindrical cores having substantially identical cross sections, wall means defining a plurality of longitudinally spaced apart notches extending transversely through each runner adjacent a longitudinal top surface of the runner at substantially identical longitudinal locations relative to the ends thereof, said runners being disposed so that the notches of each runner are aligned with corresponding notches in the other runners, said floor further including a plurality of transversely extending spaced apart deck members, each deck member comprising a longitudinally extending arcuate segment of a thick wall hollow paperboard core positioned within respective aligned notches of said runners in tight frictional engagement with said wall means, said posts comprising thick wall hollow paperboard cylindrical cores having substantially identical cross sections, means defining a pair of radially spaced apart notches extending from opposite peripheral surfaces in each post at substantially the same vertical location from bottom ends thereof, said runners having bifurcated ends defining a pair of spaced apart legs, each leg being tightly receivable within one notch of the pair of spaced apart notches of a respective post, each post further including a plurality of vertically spaced apart slots, the slots in each post being spaced apart slots, the slots in each post being aligned with respective slots in an adjacent post, and said side walls each comprising a plurality of vertically spaced apart slats, each slat comprising a longitudinally extending arcuate segment of a thick wall hollow paperboard core having ends positioned within respective slots in adjacent posts.

14. A storage bin as recited in claim 13, wherein each of the notches in each runner comprise a pair of longitudinally spaced apart linear side edges, each edge being inclined from the peripheral surface of the runner in diverging manner relative to the other edge of the pair.

15. A storage bin as recited in claim 14, wherein each of the notches in each post comprises a pair of vertically spaced apart linear edges inclined from the peripheral surface of the post in diverging manner relative to the other edge of the pairs.

16. A storage bin as recited in claim 13, wherein each bifurcated end of each runner is defined by a pair of spaced apart longitudinally extending slots in the peripheral surface of said runner at an end thereof.

17. A storage bin as recited in claim 13, wherein each vertically spaced apart slot in said posts comprise apertures formed in the periphery of said post and opening into the hollow interior of the post.

18. A storage bin as recited in claim 16, including a locking tab extending transversely through each pair of legs and the respective post to prevent withdrawal of the ends of the runners from the respective post.

19. A storage bin as recited in claim 17, wherein certain of said posts have radially spaced apart aligned slots permitting respective slats to be inserted therethrough an adjacent post and to be withdrawn therefrom for disassembly.

20. A storage bin as recited in claim 19, including a vertically disposed locking strip positioned within the interior of at least one post having said radially spaced apart slots, said locking strip being interposed between the slots remote from the adjacent post and the ends of the respective slats.

21. A storage bin as recited in claim 19, wherein each of the notches in each runner comprises a pair of longitudinally spaced apart linear side edges, each edge being inclined from the peripheral surface of the runner in diverging manner relative to the other edge of the pair.

22. A storage bin as recited in claim 21, wherein each of the notches in each post comprises a pair of vertically spaced apart linear edges inclined from the peripheral surface of the post in diverging manner relative to the other edge of the pairs.

23. A storage bin as recited in claim 22, wherein each bifurcated end of each runner is defined by a pair of spaced apart longitudinally extending slots in the peripheral surface of said runner at an end thereof.

24. A storage bin as recited in claim 23, including a locking tab extending transversely through each pair of legs and the respective post to prevent withdrawal of the ends of the runners from the respective post.

25. A storage bin as recited in claim 24, including a vertically disposed locking strip positioned within the interior of at least one post having said radially spaced apart slots, said locking strip being interposed between the slots remote from the adjacent post and the ends of the respective slats.

* * * * *